US012527585B2

(12) United States Patent
Demanget et al.

(10) Patent No.: US 12,527,585 B2
(45) Date of Patent: Jan. 20, 2026

(54) PROVISIONAL ALIGNMENT TOOLS AND METHODS FOR COMPUTER-ASSISTED ORTHOPAEDIC SURGICAL PROCEDURES

(71) Applicant: DePuy Ireland Unlimited Company, Ringaskiddy (IE)

(72) Inventors: Nicolas Demanget, Cambridge, MA (US); James Brownhill, Norton, MA (US)

(73) Assignee: DePuy Ireland Unlimited Company, Ringaskiddy (IE)

(*) Notice: Subject to any disclaimer, the term of this patent is extended or adjusted under 35 U.S.C. 154(b) by 195 days.

(21) Appl. No.: 18/230,234

(22) Filed: Aug. 4, 2023

(65) Prior Publication Data

US 2025/0040946 A1 Feb. 6, 2025

(51) Int. Cl.
| | |
|---|---|
| A61B 17/15 | (2006.01) |
| A61B 17/17 | (2006.01) |
| A61B 34/10 | (2016.01) |
| A61B 17/56 | (2006.01) |
| A61B 34/20 | (2016.01) |

(52) U.S. Cl.
CPC .......... *A61B 17/1778* (2016.11); *A61B 17/15* (2013.01); *A61B 2017/564* (2013.01); *A61B 2034/107* (2016.02); *A61B 2034/2072* (2016.02)

(58) Field of Classification Search
CPC . A61B 90/39; A61B 34/20; A61B 2034/2065; A61B 2034/2055; A61B 17/15; A61B 17/154; A61B 17/155; A61B 17/157; A61B 17/1778; A61B 2017/564
See application file for complete search history.

(56) References Cited

U.S. PATENT DOCUMENTS

| | | |
|---|---|---|
| 7,670,345 B2 | 3/2010 | Plassky et al. |
| 2005/0209598 A1 | 9/2005 | Grimm et al. |
| 2008/0027452 A1 | 1/2008 | Sheffer et al. |
| 2016/0287263 A1 | 10/2016 | Firmbach et al. |

(Continued)

OTHER PUBLICATIONS

Depuy Synthes, Inhance Shoulder System Anatomical Surgical Technique, Rev. 1, 2021, 19 pages.

(Continued)

*Primary Examiner* — Samuel S Hanna
(74) *Attorney, Agent, or Firm* — Barnes & Thornburg LLP

(57) ABSTRACT

Provisional alignment tools and associated methods for computer-assisted orthopaedic surgical procedures are disclosed. One such method comprises pinning a bone tracking assembly to a patient's bone, attaching a provisional alignment tool to the bone tracking assembly such that the provisional alignment tool maintains a cutting guide attached to the provisional alignment tool in an initial position, receiving feedback from a surgical navigation system regarding a difference between the initial position and a planned position for the cutting guide in a surgical plan for the orthopaedic surgical procedure, adjusting one or more components of the provisional alignment tool to move the cutting guide into the planned position, pinning the cutting guide to the patient's bone while the provisional alignment tool maintains the cutting guide in the planned position, and cutting the patient's bone while the bone tracking assembly remains pinned to the patient's bone.

11 Claims, 5 Drawing Sheets

(56) References Cited

U.S. PATENT DOCUMENTS

2022/0000491 A1    1/2022  Henry et al.
2022/0296390 A1*   9/2022  Paszicsnyek ......... A61F 2/4609

OTHER PUBLICATIONS

Exactech, Equinoxe Reverse Superolateral Apporach Operative Technique, Rev. C, Apr. 2020, 16 pages.
Exactech, Knee Operative Technique, Newton ExactechGPS TKA Pro Application, Rev. A, Jan. 2023, 40 pages.
Exactech, Knee Operative Technique Addendum, Truliant ExactechGPS TKA Pro Application, Rev. A, Jun. 2021, 48 pages.
Exactech, Knee Operative Technique Addendum, Truliant ExactechGPS RTKA Application, Rev. B, Jun. 2021, 60 pages.
Exactech, Knee Operative Technique, GPS Knee TKA Plus Application with Truliant Implants and Instrumentation, Rev. D, May 2023, 24 pages.

* cited by examiner

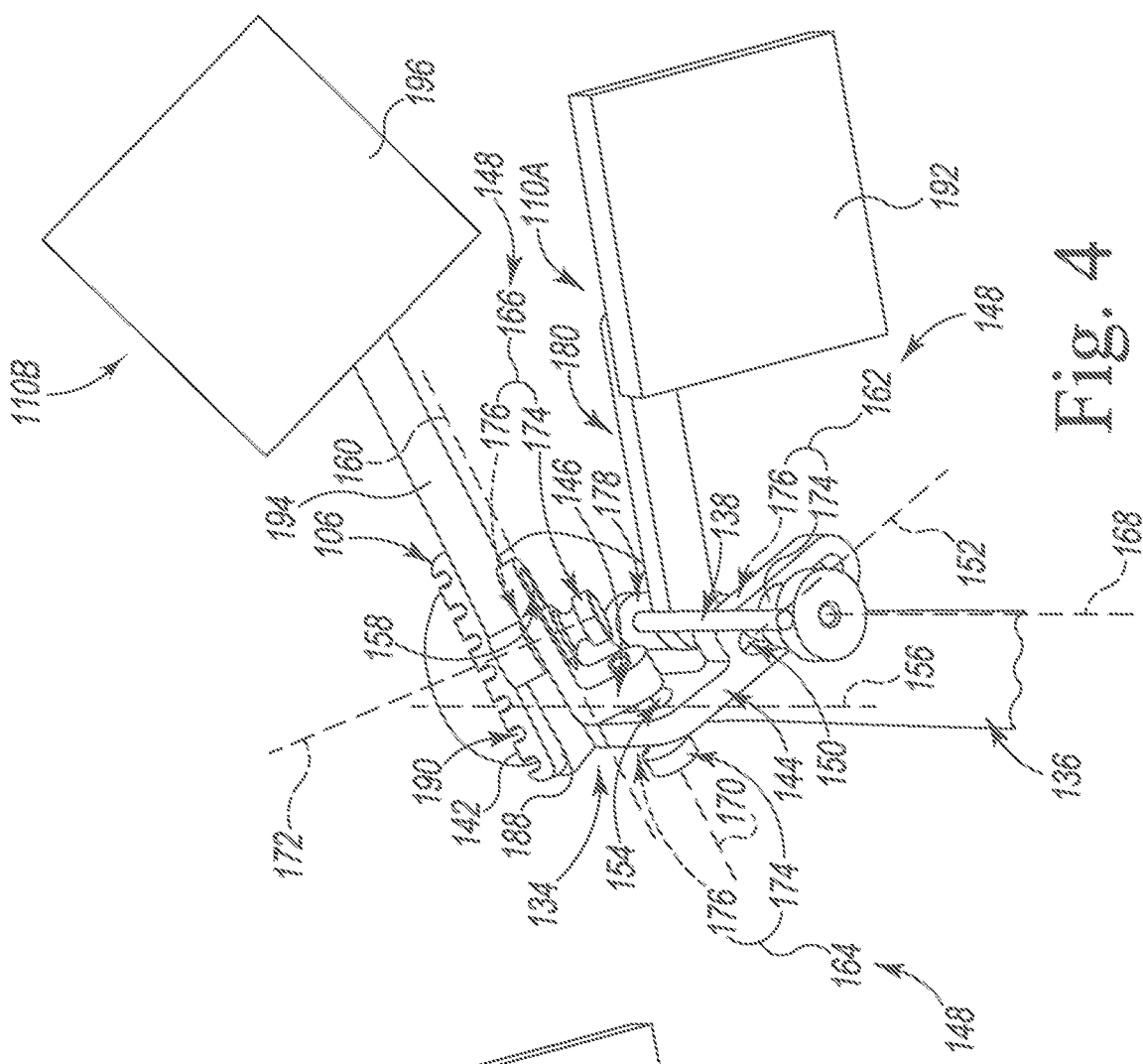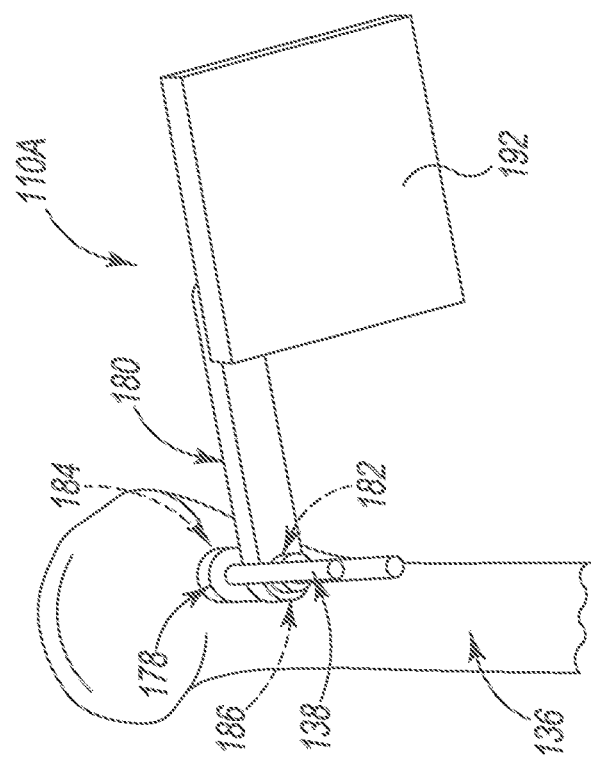

PROVISIONAL ALIGNMENT TOOLS AND METHODS FOR COMPUTER-ASSISTED ORTHOPAEDIC SURGICAL PROCEDURES

TECHNICAL FIELD

The present disclosure relates generally to orthopaedic surgical procedures and, more particularly, to provisional alignment tools and associated methods for computer-assisted orthopaedic surgical procedures.

BACKGROUND

Joint arthroplasty is a well-known surgical procedure by which a diseased and/or damaged natural joint is replaced by a prosthetic joint, which may include one or more orthopaedic implants. To facilitate the replacement of the natural joint with the prosthetic joint, orthopaedic surgeons may use a variety of orthopaedic surgical instruments such as, for example, surgical saws, cutting guides, reamers, broaches, drill guides, drills, positioners, insertion tools and/or other surgical instruments. For instance, a surgeon may use a cutting guide to guide a surgical saw blade when resecting a patient's bone during an orthopaedic procedure. In some cases, the surgeon may use a surgical navigation system for more accurate placement of the cutting guide and/or the surgical saw blade relative to the patient's bone.

SUMMARY

According to one aspect, a method for a computer-assisted orthopaedic surgical procedure may comprise pinning a bone tracking assembly to a patient's bone to allow a surgical navigation system to track the patient's bone in space, attaching a provisional alignment tool to the bone tracking assembly such that the provisional alignment tool maintains a cutting guide attached to the provisional alignment tool in an initial position relative to the patient's bone, receiving feedback from the surgical navigation system regarding a difference between the initial position of the cutting guide and a planned position for the cutting guide relative to the patient's bone in a surgical plan for the orthopaedic surgical procedure, adjusting one or more components of the provisional alignment tool to move the cutting guide into the planned position, pinning the cutting guide to the patient's bone while the provisional alignment tool maintains the cutting guide in the planned position, and cutting the patient's bone while the bone tracking assembly remains pinned to the patient's bone. A guide tracking assembly may be attached to the cutting guide to allow the surgical navigation system to track the cutting guide in space.

In some embodiments, the patient's bone may be a humerus. The planned position may be located inferior to the humeral head and superior to the greater tuberosity of the humerus.

In some embodiments, cutting the patient's bone may comprise moving a cutting tool along a surface of the cutting guide.

In some embodiments, the method may further comprise disconnecting the provisional alignment tool from the cutting guide after the cutting guide has been pinned to the patient's bone and before cutting the patient's bone. The method may further comprise disconnecting the guide tracking assembly from the cutting guide after the cutting guide has been pinned to the patient's bone and before cutting the patient's bone.

In some embodiments, the method may further comprise disconnecting the provisional alignment tool from the bone tracking assembly after the cutting guide has been pinned to the patient's bone and before cutting the patient's bone.

In some embodiments, adjusting one or more components of the provisional alignment tool may comprise incrementally adjusting one or more of version, inclination, or position of the cutting guide until the cutting guide is in the planned position.

According to another aspect, a method for a computer-assisted orthopaedic surgical procedure may comprise securing a bone tracking assembly to a patient's bone using one or more pins and attaching a first end of a provisional alignment tool to the one or more pins. A cutting guide with a guide tracking assembly may be attached to the second end of the provisional alignment tool. The method may further comprise adjusting one or more components of the provisional alignment tool to move the cutting guide into a planned position relative to the patient's bone while a surgical navigation system tracks (i) the patient's bone using the bone tracking assembly and (ii) the cutting guide using the guide tracking assembly, securing the cutting guide to the patient's bone using a plurality of pins while the provisional alignment tool maintains the cutting guide in the planned position, and cutting the patient's bone by moving a cutting tool along a surface of the cutting guide.

In some embodiments, the surgical navigation system may provide feedback regarding a difference between a current position of the cutting guide and the planned position during the adjustment of the one or more components of the provisional alignment tool.

In some embodiments, cutting the patient's bone may comprise cutting the patient's bone while the one or more pins remain in the patient's bone.

In some embodiments, securing the cutting guide to the patient's bone may comprise inserting the plurality of pins through the cutting guide and into the patient's bone in positions inferior and tangential to the surface of the cutting guide.

In some embodiments, the method may further comprise disconnecting the second end of the provisional alignment tool from the cutting guide after the cutting guide has been secured to the patient's bone and before cutting the patient's bone. The method may further comprise disconnecting the guide tracking assembly from the cutting guide after the cutting guide has been secured to the patient's bone and before cutting the patient's bone.

In some embodiments, the method may further comprise disconnecting the first end of the provisional alignment tool from the one or more pins after the cutting guide has been secured to the patient's bone and before cutting the patient's bone. The method may further comprise removing the one or more pins securing the bone tracking assembly to the patient's bone before cutting the patient's bone.

In some embodiments, adjusting one or more components of the provisional alignment tool may comprise incrementally adjusting one or more of version, inclination, or position of the cutting guide until the cutting guide is in the planned position.

In some embodiments, the planned position may be part of a surgical plan developed prior to beginning the orthopaedic surgical procedure.

In some embodiments, the patient's bone may be a humerus. The planned position may be located inferior to the humeral head and superior to the greater tuberosity of the humerus.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which:

FIG. 3 is a schematic diagram illustrating pinning a bone tracking assembly to a patient's humerus in accordance with an embodiment of the method of FIG. 2;

FIG. 4 is a schematic diagram illustrating attaching a provisional alignment tool supporting a cutting guide to the bone tracking assembly in accordance with an embodiment of the method of FIG. 2;

DETAILED DESCRIPTION OF THE DRAWINGS

Figure 1:
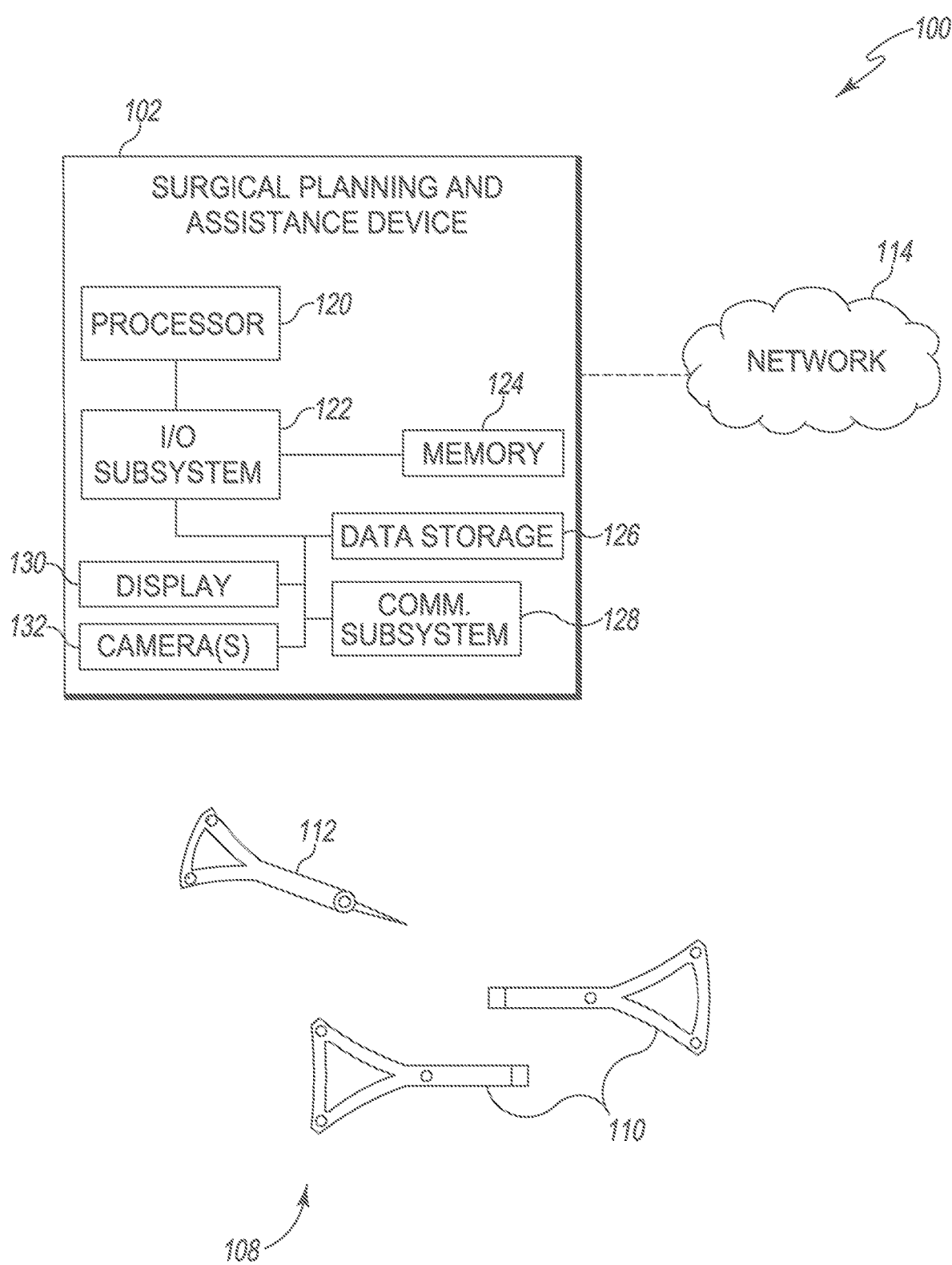
FIG. 1 is a schematic diagram of a system for navigating a computer-assisted orthopaedic surgical procedure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Terms representing anatomical references, such as anterior, posterior, medial, lateral, superior, inferior, etcetera, may be used throughout the specification in reference to the orthopaedic implants or prostheses and surgical instruments described herein as well as in reference to the patient's natural anatomy. Such terms have well-understood meanings in both the study of anatomy and the field of orthopaedics. Use of such anatomical reference terms in the written description and claims is intended to be consistent with their well-understood meanings unless noted otherwise.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a surgical system 100 for use during an orthopaedic surgical procedure, such as a total shoulder arthroplasty (TSA) procedure, a total hip arthroplasty (THA) procedure, a total knee arthroplasty (TKA) procedure, or a unicompartmental knee arthroplasty (UKA) procedure, is shown. As described further below, during the orthopaedic surgical procedure, an orthopaedic surgeon positions a cutting guide 106 with the assistance of a provisional alignment tool 134 and the system 100. In the illustrative embodiment, the cutting guide 106 may also be referred to as a navigated humeral resection guide 106. While tracking the cutting guide 106 with a guide tracking assembly 110B, the system 100 determines the location of the cutting guide 106 relative to a planned position for the cutting guide 106 in a surgical plan for the orthopaedic surgical procedure (for example, developed prior to beginning the procedure). The surgeon positions (or repositions) the cutting guide 106 using the provisional alignment tool 134 until the cutting guide 106 is in the planned position. In some embodiments, the planned position may be located inferior to the humeral head and superior to the greater tuberosity of the patient's humerus 136.

The provisional alignment tool 134 allows the surgeon to position and secure the cutting guide 106 in the planned position while reducing both the number of pinholes in stress-bearing regions of the patient's bone 136 and the amount of hardware in and around the exposure when the patient's bone 136 is cut. As compared to other adjustable cutting guides, the provisional alignment tool 134 does not require the surgeon to place additional pins to provisionally hold the cutting guide 106 in place during fine-tuning of the position of the cutting guide 106. Rather, in some embodiments, the provisional alignment tool 134 can utilize the same pin(s) used to secure a bone tracking assembly 110A to the patient's bone 136. Thus, the provisional alignment tool 134 may reduce the risk of fracture associated with too many pinholes formed in stress-bearing regions of the patient's bone 136. The illustrative embodiment also allows the surgeon to remove the provisional alignment tool 134 prior to cutting so that vibration of the surgical saw on the cut guide 106 does not impact the bone tracking assembly 110A.

As shown in FIG. 1, the system 100 includes the surgical navigation system 102 and multiple registration tools 108. The surgical navigation system 102 may be embodied as any type of computer system capable of performing the functions described herein. For example, the surgical navigation system 102 may be embodied as, without limitation, a workstation, a desktop computer, a laptop computer, a special-purpose compute device, a server, a rack-mounted server, a blade server, a network appliance, a web appliance, a tablet computer, a smartphone, a consumer electronic device, a distributed computing system, a multiprocessor system, and/or any other computing device capable of performing the functions described herein. Additionally, although the surgical navigation system 102 is illustrated in FIG. 1 as embodied as a single computer, it should be appreciated that the surgical navigation system 102 may be embodied as multiple devices cooperating together to facilitate the functionality described below. For example, in some embodiments, the system 100 may include a base station and a satellite station or other combination of computing devices. Additionally or alternatively, in some embodiments, the surgical navigation system 102 may be embodied as a "virtual server" formed from multiple computer systems distributed across a network and operating in a public or private cloud.

As shown in FIG. 1, the illustrative surgical navigation system 102 includes a processor 120, an I/O subsystem 122, memory 124, a data storage device 126, and a communication subsystem 128. Of course, the surgical navigation system 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or controller capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the surgical navigation system 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the surgical navigation system 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the surgical navigation system 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the surgical navigation system 102 may be embodied as any communication circuit, device, or collection thereof, capable of enabling communications between the surgical navigation system 102 and remote devices. The communication subsystem 128 may be configured to use any one or more communication technology (e.g., wireless or wired communications) and associated protocols (e.g., Ethernet, Bluetooth®, Wi-Fi®, WiMAX, etc.) to effect such communication.

As shown in FIG. 1, the surgical navigation system 102 includes a display 130. The display 130 may be embodied as any type of display capable of displaying digital images or other information, such as a liquid crystal display (LCD), a light emitting diode (LED), a plasma display, a cathode ray tube (CRT), or other type of display device. In some embodiments, the display 130 may be coupled to a touch screen to allow user interaction with the surgical navigation system 102.

The surgical navigation system 102 further includes one or more cameras 132. Each of the cameras 132 may be embodied as a digital camera or other digital imaging device coupled to the surgical navigation system 102. Each camera 132 includes an electronic image sensor, such as an active-pixel sensor (APS), e.g., a complementary metal-oxide-semiconductor (CMOS) sensor, or a charge-coupled device (CCD). In the illustrative embodiment, multiple cameras 132 are arranged in an array and are thus capable of determining distance to objects imaged by the cameras 132.

The surgical navigation system 102 may be configured to transmit and receive data with each other and/or other devices of the system 100 over a network 114. The network 114 may be embodied as any number of various wired and/or wireless networks. For example, the network 114 may be embodied as, or otherwise include, a wired or wireless local area network (LAN), a wired or wireless wide area network (WAN), a cellular network, and/or a publicly-accessible, global network such as the Internet. As such, the network 114 include any number of additional devices, such as additional computers, routers, stations, and switches, to facilitate communications among the devices of the system 100.

As shown in FIG. 1, the system 100 further includes a number of registration tools 108. As described further below, in use, the surgical navigation system 102 may track the location of the registration tools 108 in space using the array of cameras 132. For example, each registration tool 108 may include a number of hydrophobic optical reflectors arranged in a predetermined pattern visible to the cameras 132. As another example, each registration tool 108 may include an array on which a predetermined, two-dimensional pattern that can be sensed by the cameras 132 is printed (or affixed). Illustratively, the registration tools 108 include a plurality of tracking assemblies 110 configured to each be secured to one of the patient's bones 136 or to the cutting guide 106. For example, in the illustrative embodiment, the plurality of tracking assemblies 110 includes the guide tracking assembly 110B to track a location of the cutting guide 106 and the bone tracking assembly 110A to track a location of the patient's bone 136 in space (as illustrated, for example, in FIGS. 4 and 5).

The registration tools 108 may also include a pointer 112 configured to be temporarily positioned by a surgeon relative to anatomical landmarks of the patient (e.g., with an end of the pointer 112 in contact those anatomical landmarks) or other components of the system 100 while the pointer 112 is observed by the cameras 132. As such, the pointer 112 may be used for example, for registration and tracking of the patient's bony anatomy during the orthopaedic surgical procedure. Although illustrated as including registration tools 108 suitable for optical tracking with the cameras 132, it should be understood that in some embodiments, the system 100 may use electromagnetic tracking or other position tracking technology for tracking the registration tools 108.

Figure 2:
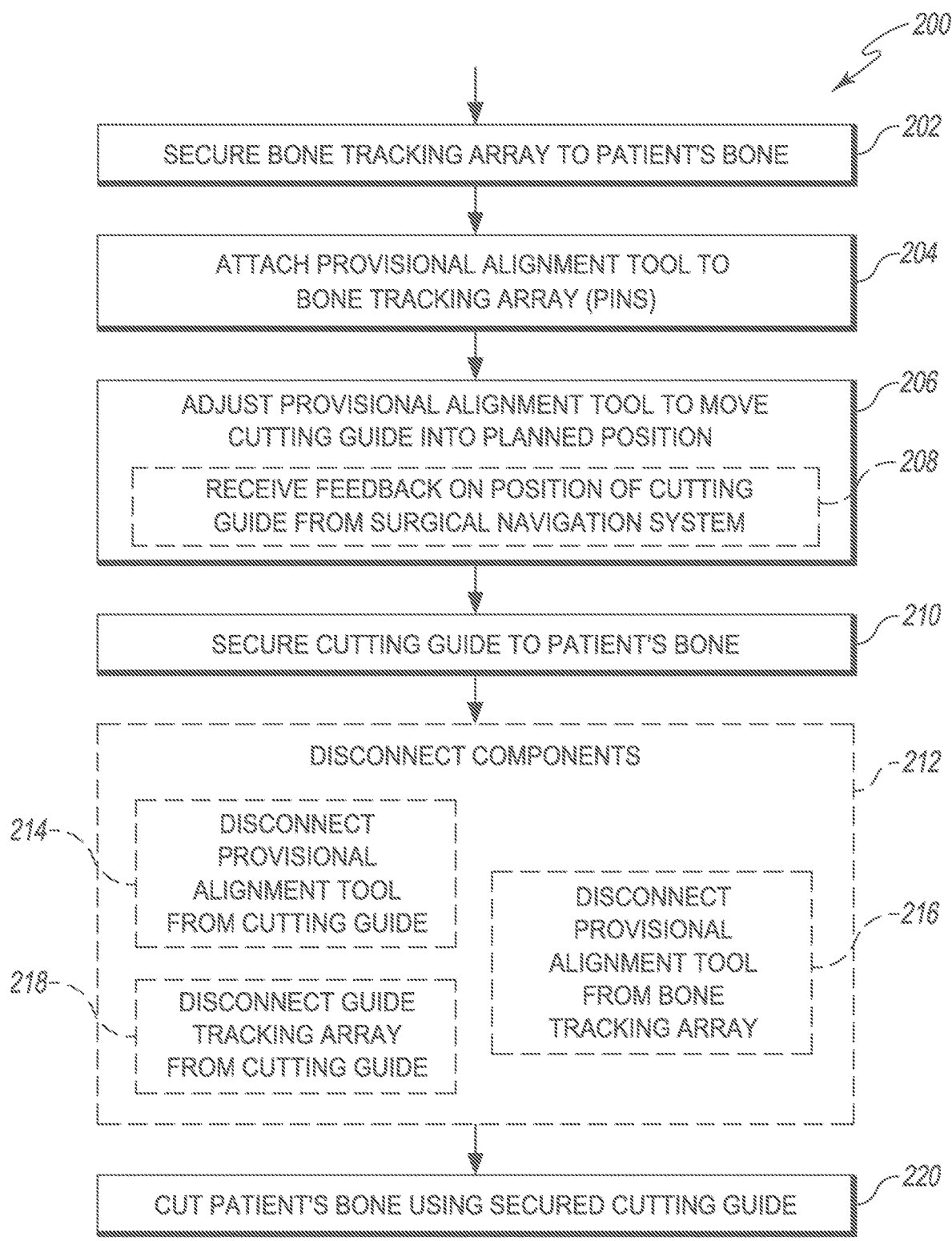
FIG. 2 is a simplified flow diagram of a method for a computer-assisted orthopaedic surgical procedure, which may be performed using the system FIG. 1.

Referring now to FIG. 2, in use, the surgical navigation system 102 may assist the surgeon (or other user(s) acting at the surgeon's direction) to perform a method 200 for an orthopaedic surgical procedure. The method 200 begins with block 202, in which the surgeon secures or pins the bone tracking assembly 110A to the patient's bone 136 to allow the surgical navigation system 102 to track the patient's bone 136 in space. In some embodiments, the bone tracking assembly 110A may be secured to the patient's bone using one or more pins 138 (illustrated as two pins 138 in the drawings). In the illustrative embodiment, the bone tracking assembly 110A is secured to the patient's humerus 136, such as inferior to the greater tuberosity and/or inferior to the planned position for the cutting guide 106, as shown in FIG. 3 and described in further detail below. Once the bone tracking assembly 110A is secured to the patient's bone 136, the surgeon may move the patient's bone 136 while the surgical navigation system 102 tracks the bone 136 in space using the bone tracking assembly 110A. In the illustrative embodiment of the method 200, the bone tracking assembly 110A remains secured (pinned) to the patient's bone 136 throughout the orthopaedic surgical procedure (e.g., until after all bone cuts have been completed, or until after the surgeon has implanted one or more prosthetic components on the patient's bone).

Figure 5:
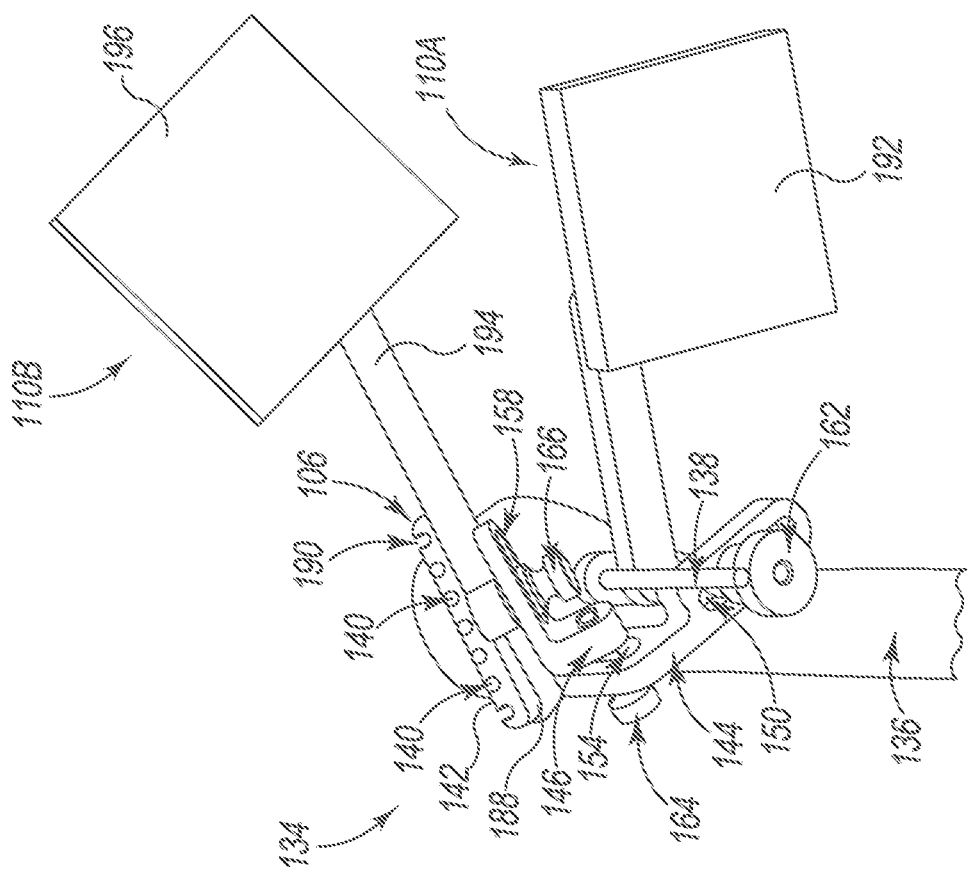
FIG. 5 is a schematic diagram illustrating pinning the cutting guide to the patient's humerus in accordance with an embodiment of the method of FIG. 2.

After block 202, the method 200 proceeds to block 204, in which the surgeon attaches the provisional alignment tool 134 to the bone tracking assembly 110A. In some embodiments of block 204, attaching the provisional alignment tool 134 to the bone tracking assembly 110A may comprise attaching the provisional alignment tool 134 to the pin(s) 138 used to secure the bone tracking assembly 110A to the patient's bone 136. Once secured, the provisional alignment tool 134 maintains a cutting guide 106 attached to the provisional alignment tool 134 in an adjustable position relative to the patient's bone 136, as shown in FIGS. 4 and 5, by way of example.

After block 204, the method 200 proceeds to block 206, in which the surgeon adjusts one or more components of the provisional alignment tool 134, as needed, to move the cutting guide 106 into the planned position relative to the patient's bone 136. In the illustrative embodiment, a guide tracking assembly 110B is attached to the cutting guide 106. As shown in FIGS. 4 and 5, this guide tracking assembly 110B includes an arm 194 and an array 196 (on which a predetermined, two-dimensional pattern that can be sensed by the cameras 132 is printed or affixed). The guide tracking assembly 110B allows the surgical navigation system 102, during block 206, to track the cutting guide 106 and to provide the surgeon with feedback regarding a difference between a current position of the cutting guide 106 and the planned position for the cutting guide 106 relative to the patient's bone 136 in the surgical plan (as shown in block 208). Upon receiving this feedback, the surgeon can then adjust one or more components of the provisional alignment tool 134 until the current position of the cutting guide 106 matches the planned position in the surgical plan. Block 206 may involve the surgeon incrementally adjusting one or more of version, inclination, or position of the cutting guide 106 until the cutting guide 106 may adjusting various components of the provisional alignment tool 134.

After block 206, the method 200 proceeds to block 210, in which the surgeon secures the cutting guide 106 to the patient's bone 136 while the provisional alignment tool 134 maintains the cutting guide 106 in the planned position. In some embodiments of block 210, securing the cutting guide 106 to the patient's bone 136 may comprise pinning the cutting guide 106 to the patient's bone 136 using a plurality of pins 140. For instance, the surgeon may insert the plurality of pins 140 through the cutting guide 106 and into the patient's bone 136 in positions inferior and tangential to a cutting surface 142 of the cutting guide 106, as suggested in FIG. 5.

After block 210, the method 200 optionally proceeds to block 212, in which the surgeon disconnects the provisional alignment tool 134 from the cutting guide 106 and/or the bone tracking assembly 110A. For instance, block 212 may involve block 214 in which the surgeon disconnects the provisional alignment tool 134 from the cutting guide 106 after the cutting guide 106 has been pinned (or otherwise secured) to the patient's bone 136. Additionally or alternatively, block 212 may involve block 216 in which the surgeon disconnects the provisional alignment tool 134 from the bone tracking assembly 110A after the cutting guide 106 has been pinned (or otherwise secured) to the patient's bone 136. In either case, disconnecting the provisional alignment tool 134 from at least one of the cutting guide 106 or the bone tracking assembly 110A, prior to cutting the patient's bone 136, prevents vibrations of the surgical saw from being transferred through the provisional alignment tool 134 to the bone tracking assembly 110A, decreasing the risk that the bone tracking assembly 110A will become unsecured from the patient's bone 136 during the cutting.

In some embodiments, block 212 may additionally involve block 218, in which the guide tracking assembly 110B is disconnected from the cutting guide 106. Removing the guide tracking assembly 110B may allow for easier access to the cutting surface 142 of the cutting guide 106, as suggested in FIGS. 6 and 7. It is also contemplated that, in some embodiments, block 212 may additionally include removing the pin(s) 138 securing the bone tracking assembly 110A to the patient's bone 136 before cutting the patient's bone 136 (although, advantageously, this is not required).

After block 212 (or after block 210 where optional block 212 is not used), the method 200 proceeds to block 220, in which the surgeon cuts the patient's bone 136 using the cutting guide 106. In the illustrative embodiment, block 220 involves the surgeon move a cutting tool (e.g., an oscillating saw blade of a surgical saw) along the cutting surface 142 of the cutting guide 106 to resect a bone portion 236 from the remainder of the patient's bone 136, as suggested in FIG. 7. The bone tracking assembly 110A may remain pinned (or otherwise secured) to the patient's bone 136 during the resection in block 220. Similarly, the pin(s) 138 may remain in the patient's bone 136 during the resection in block 220. After block 220, the surgeon may continue the orthopaedic surgical procedure, for example, by installing one or more trial components, one or more prosthetics, or otherwise completing the orthopaedic surgical procedure.

Referring now to FIGS. 3-7, one illustrative embodiment of the method 200 is shown for resection of a patient's humerus 136 as part of a TSA procedure. As shown in FIGS. 4 and 5, in this illustrative embodiment, the provisional alignment tool 134 includes a link 144, a link 146, and a plurality of fasteners 148. The link 144 is configured to connect to the bone tracking assembly 110A via (at least) one of the plurality of fasteners 148. The link 146 is configured to connect to the cutting guide 106 and/or the guide tracking assembly 110B via another (at least) one of the plurality of fasteners 148. The plurality of fasteners 148 are also configured to interconnect the link 144 and the link 146. With the plurality of fasteners 148, the provisional alignment tool 134 is adjustable to hold the cutting guide 106 in position relative to the patient's bone 136 (e.g., in the planned position while the cutting guide 106 is pinned to the patient's bone 136). The plurality of fasteners 148 also make the provisional alignment tool 134 removable from the bone tracking assembly 110A and/or from the cutting guide 106 to allow the bone tracking assembly 110A to remain pinned to the patient's bone 136 while the cutting guide 106 remains pinned to the patient's bone 136.

As shown in FIGS. 4 and 5, in the illustrative embodiment, the link 144 is formed to include a slot 150 defining a translational axis 152 and a slot 154 defining a translational axis 156 that is different from the translational axis 152. The slot 150 is spaced apart from and is arranged perpendicularly relative to the slot 154. The link 146 is formed to include a slot 158 defining a translational axis 160 that is different from the translational axis 152 and the translational axis 156. In some embodiments, the translational axis 152 defined by slot 150 may be parallel to the bone tracking assembly 110A when the provisional alignment tool 134 is attached to the bone tracking assembly 110A, and the translational axis 160 defined by the slot 158 may be parallel to the cutting surface 142 of the cutting guide 106 when the cutting guide 106 and/or the guide tracking assembly 110B is attached to the provisional alignment tool 134.

The plurality of fasteners 148 includes a fastener 162, a fastener 164, and a fastener 166. The fastener 162 is received in the slot 150 to adjustably connect the bone tracking assembly 110A and the link 144. The fastener 164 is received in the slot 154 to adjustably connect the link 144 and the link 146. The fastener 166 is received in the slot 158 to adjustably connect the link 146 and the cutting guide 106 and/or the guide tracking assembly 110A. The fastener 162 defines a rotational axis 168, while the fastener 164 defines a rotational axis 170, and the fastener 166 defines a rotational axis 172. Each fastener 162, 164, 166 is adjustable between a locked configuration and an unlocked configuration. When each of the fasteners 162, 164, 166 is its locked configuration, the cutting guide 106 is constrained against movement along all of the translational axes 152, 156, 166 and the rotational axes 168, 170, 172. Adjusting any of the fasteners 162, 164, 166 to its unlocked configuration may allow movement of the cutting guide 106 along the corresponding axes (e.g., loosening the fastener 162 permits movement of the cutting guide along the translational axis 150 and about the rotational axis 168). Thus, the cutting guide 106 may be movable about six degrees of freedom when all fasteners 162, 164, 166 are in their unlocked configurations. In some embodiments, as shown in FIG. 4, each fastener 162, 164, 166 may include an adjustment wheel 174 and a screw 176 coupled to the adjustment wheel 174 and defining the respective rotational axis 168, 170, 172. It is contemplated that, in other embodiments, the provisional alignment tool 134 may have alternative designs which allow the surgeon to adjust the cutting guide 106 while utilizing the attachment of the bone tracking assembly 110A to the patient's bone 136.

As shown in FIG. 3, in the illustrative embodiment, the bone tracking assembly 110A includes a clamp base 178, a clamp arm 180, and an array 192 (on which a predetermined, two-dimensional pattern that can be sensed by the cameras 132 is printed or affixed). The clamp arm 180 is formed to include an aperture 182. The clamp base 178 is formed to include a plurality of apertures 184, 186. As further discussed below, the fastener 162 of the provisional alignment tool 134 may be received in the aperture 182 of the clamp arm 180 and the aperture 186 of the clamp base 178. To secure the bone tracking assembly 110A to the patient's bone 136, the surgeon may position the clamp base 178 tangential, posterior, and/or inferior to the planned position. The surgeon may then insert the pin(s) 138 into the aperture(s) 184 to secure the clamp base 178 to the patient's bone 136. If not already assembled, the surgeon may secure the clamp arm 180 to the clamp base 178 by feeding the screw 176 of the fastener 162 through the aperture 182 at one end of the clamp arm 180 and may secure the array 192 to an opposite end of the clamp arm 180. In some embodiments, the clamp base 178, the clamp arm 180, the array 192 and/or the fastener 162 may be pre-assembled before the surgeon attaches the bone tracking assembly 110A to the patient's bone 136. In other embodiments, the clamp base 178, the clamp arm 180, and/or the array 192 of the bone tracking assembly 110A may be integrally formed.

As shown in FIG. 4 and with reference to block 204 of FIG. 2 (described above), the provisional alignment tool 134 is attached to the bone tracking assembly 110A by feeding the screw 176 of the fastener 162 through the slot 150 and tightening the adjustment wheel 174 of the fastener 162 onto the screw, such that the slot 150 is positioned axially between the adjustment wheel 174 and the bone tracking assembly 110A relative to the rotational axis 168. In some embodiments, the entire provisional alignment tool 134 may be pre-assembled before securing the link 144 to the bone tracking assembly 110A via the fastener 162 and the slot 150. Additionally or alternatively, the link 150 may attach, couple, or be secured to the pin(s) 138. In other embodiments, the provisional alignment tool 134 may be disassembled and after the link 144 is secured to the bone tracking assembly 110A and/or the pin(s) 138, the link 146 may be attached to the link 144 and the cutting guide 106 and/or the guide tracking assembly 110B may be attached to the link 146 in a similar manner as described above. Once the provisional alignment tool 134 is attached to the bone tracking assembly 110A and/or the pin(s) 138, the surgeon adjusts the position of the cutting guide 106 in accordance with block 206 of FIG. 2. For instance, the surgeon may move the cutting guide 106 about one or more of the six degrees of freedom of the provisional alignment tool 134 to position the cutting guide 106 in the planned position. As described above, in the illustrative embodiment, the surgeon can adjust one or more of the fasteners 162, 164, 166 to move the cutting guide 106 to the planned position.

As shown in FIG. 5, and with reference to block 210 of FIG. 2 (described above), the cutting guide 106 is pinned to the patient's bone 136 with the plurality of pins 140 once the cutting guide 106 is in the planned position. The cutting guide 106 includes the cutting surface 142 and a bottom surface 188 opposite the cutting surface 142. The cutting guide 106 further includes a plurality of pin slots 190 formed between the cutting surface 142 and the bottom surface 188. The plurality of pin slots 190 are configured to receive the plurality of pins 140 when the surgeon pins the cutting guide 106 to the patient's bone 136. In the illustrative embodiment, the plurality of pin slots 190 open into the cutting surface 142 such that the cutting surface 142 is discontinuous. In the illustrative embodiment, the guide tracking assembly 110B is selectively removable from the cutting guide 106. In other embodiments, the guide tracking assembly 110B may be integrally formed with the cutting guide 106.

Figure 6:
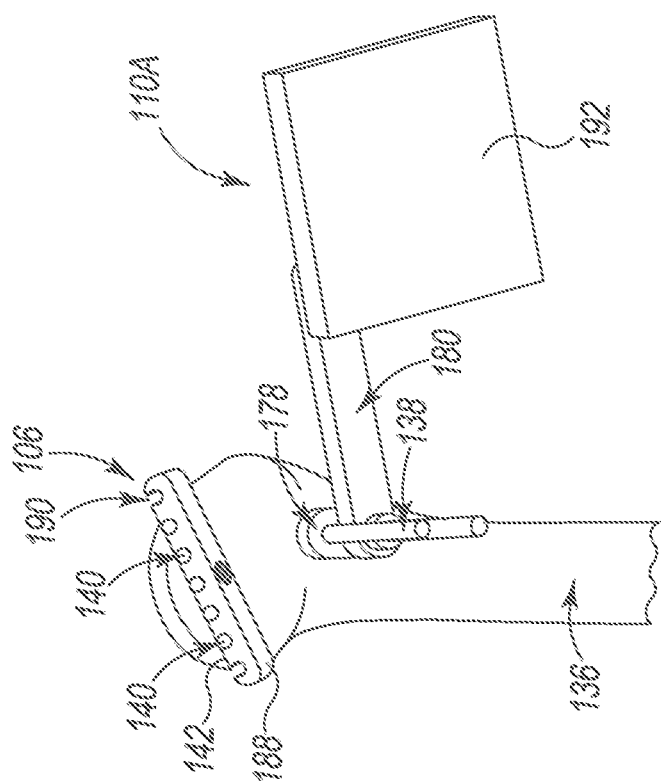
FIG. 6 is a schematic diagram illustrating disconnecting the provisional alignment tool and the guide tracking assembly in accordance with an embodiment of the method of FIG. 2.

As shown in FIG. 6, and with reference to block 212 of FIG. 2 (described above), the provisional alignment tool 134 is disconnected from the cutting guide 106 and the bone tracking assembly 110A after the cutting guide 106 has been pinned to the patient's bone 136 in the planned position. To disconnect the provisional alignment tool 134 from the cutting guide 106 and the bone tracking assembly 110A, the surgeon may adjust the fastener 166 and the fastener 162, respectively, to the unlocked configuration. Additionally or alternatively, the surgeon may remove the fastener 166 from the cutting guide 106 and/or remove the adjustment wheel 174 from the fastener 162 so the link 144 is removed from the screw 176 of the fastener 162 via the slot 150.

Additionally, as shown in FIG. 6, the guide tracking assembly 110B is disconnected from the cutting guide 106 after the cutting guide 106 has been pinned to the patient's bone 136 in the planned position. To disconnect the guide tracking assembly 110B from the cutting guide 106, the surgeon may remove the guide tracking assembly 110B with the fastener 166. In some embodiments, the guide tracking assembly 110B may be attached to the cutting guide 106 separately from the fastener 166. In other embodiments, the guide tracking assembly 110B may be secured to the cutting guide 106 via the fastener 166 such that the arm 194 of the guide tracking assembly 110B is positioned axially between the bottom surface 188 of the cutting guide and the link 146 relative to the rotational axis 172.

Figure 7:
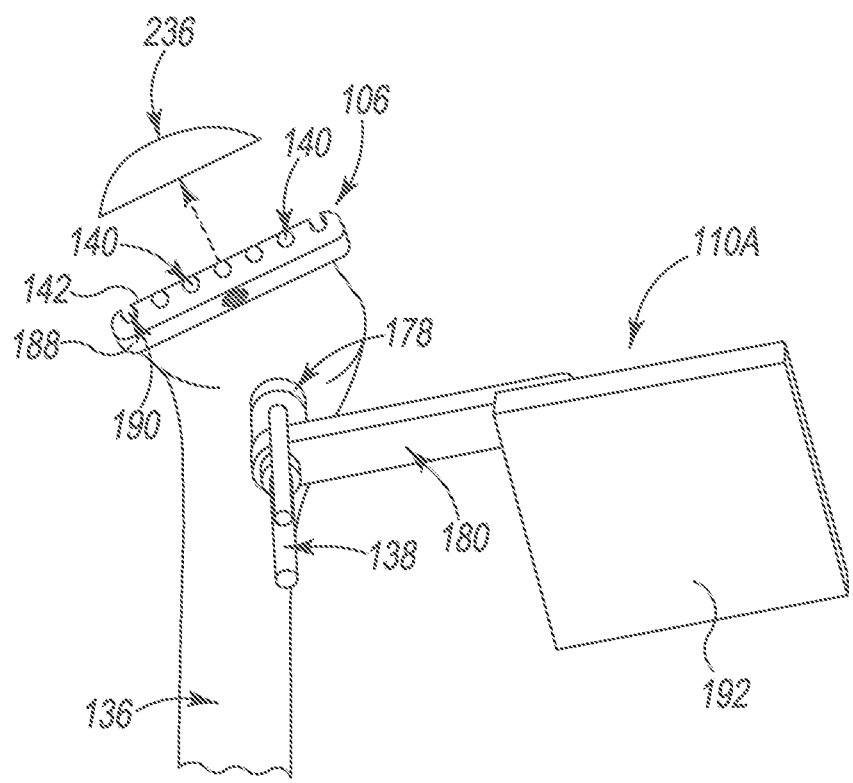
FIG. 7 is a schematic diagram illustrating cutting the patient's humerus while the bone tracking assembly remains pinned to the patient's humerus in accordance with an embodiment of the method of FIG. 2.

As shown in FIG. 7, and with reference to block 220 of FIG. 2 (described above), the patient's bone 136 is cut by the surgeon using the cutting surface 142 of the pinned cutting guide 106. In particular, the surgeon moves a cutting tool (e.g., an oscillating saw blade of a surgical saw) along the cutting surface 142 of the cutting guide 106 to resect the bone portion 236 from the remainder of the patient's bone 136. As discussed above, the bone tracking assembly 110A may remain pinned (or otherwise secured) to the patient's bone 136 during this resection, allowing the bone tracking assembly 110A to be used in subsequent portions of the orthopaedic surgical procedure.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure.

The invention claimed is:

1. A method for a computer-assisted orthopaedic surgical procedure, the method comprising:
    securing a bone tracking assembly to a patient's bone using one or more pins;
    attaching a first end of a provisional alignment tool to the one or more pins, wherein a cutting guide with a guide tracking assembly are attached to second end of the provisional alignment tool;
    adjusting one or more components of the provisional alignment tool to move the cutting guide into a planned position relative to the patient's bone while a surgical navigation system tracks (i) the patient's bone using the bone tracking assembly and (ii) the cutting guide using the guide tracking assembly;
    securing the cutting guide to the patient's bone using a plurality of pins while the provisional alignment tool maintains the cutting guide in the planned position;
    disconnecting the second end of the provisional alignment tool from the cutting guide after the cutting guide has been secured to the patient's bone and before cutting the patient's bone; and
    cutting the patient's bone by moving a cutting tool along a surface of the cutting guide.

2. The method of claim 1, wherein the surgical navigation system provides feedback regarding a difference between a current position of the cutting guide and the planned position during the adjustment of the one or more components of the provisional alignment tool.

3. The method of claim 1, wherein cutting the patient's bone comprises cutting the patient's bone while the one or more pins remain in the patient's bone.

4. The method of claim 1, wherein securing the cutting guide to the patient's bone comprises inserting the plurality of pins through the cutting guide and into the patient's bone in positions inferior and tangential to the surface of the cutting guide.

5. The method of claim 1, further comprising disconnecting the guide tracking assembly from the cutting guide after the cutting guide has been secured to the patient's bone and before cutting the patient's bone.

6. The method of claim 1, further comprising disconnecting the first end of the provisional alignment tool from the one or more pins after the cutting guide has been secured to the patient's bone and before cutting the patient's bone.

7. The method of claim 6, further comprising removing the one or more pins securing the bone tracking assembly to the patient's bone before cutting the patient's bone.

8. The method of claim 1, wherein adjusting one or more components of the provisional alignment tool comprises incrementally adjusting one or more of version, inclination, or position of the cutting guide until the cutting guide is in the planned position.

9. The method of claim 1, wherein the planned position is part of a surgical plan developed prior to beginning the orthopaedic surgical procedure.

10. The method of claim 1, wherein the patient's bone is a humerus.

11. The method of claim 10, wherein the planned position is located inferior to the humeral head and superior to the greater tuberosity of the humerus.

* * * * *